United States Patent [19]

Kawashima et al.

[11] Patent Number: 4,646,524
[45] Date of Patent: Mar. 3, 1987

[54] METHOD OF INTENSIFYING HEAT IN REVERSED RANKINE CYCLE AND REVERSED RANKINE CYCLE APPARATUS FOR CONDUCTING THE SAME

[75] Inventors: Junzo Kawashima; Nobuyuki Araki, both of Hamamatsu, Japan

[73] Assignee: Jantec Co., Ltd., Hamamatsu, Japan

[21] Appl. No.: 807,895

[22] PCT Filed: Mar. 22, 1985

[86] PCT No.: PCT/JP85/00139
§ 371 Date: Nov. 21, 1985
§ 102(e) Date: Nov. 21, 1985

[87] PCT Pub. No.: WO85/04465
PCT Pub. Date: Oct. 10, 1985

[30] Foreign Application Priority Data

Mar. 23, 1984 [JP] Japan ................................. 59-54364
Apr. 20, 1984 [JP] Japan ................................. 59-78699
May 31, 1984 [JP] Japan ................................. 59-109662

[51] Int. Cl.[4] .............................................. F25B 9/02
[52] U.S. Cl. .............................................. 62/5; 62/402
[58] Field of Search ................................. 62/5, 402

[56] References Cited

U.S. PATENT DOCUMENTS 2,920,457 1/1960 Bartlett, Jr. ................................. 62/5
4,302,949 12/1981 Longhetto ................................. 62/5

FOREIGN PATENT DOCUMENTS 16242 3/1973 Japan.
058648 5/1976 Japan.
052675 12/1978 Japan.

Primary Examiner—Ronald C. Capossela
Attorney, Agent, or Firm—Armstrong, Nikaido, Marmelstein & Kubovcik

[57] ABSTRACT

A reversed Rankine cycle system, wherein a vortex tube is disposed between the compressor and the condenser in a reversed Rankine cycle, the superheated vapors of coolant at a high pressure discharged from the compressor are taken out while separating them by the vortex tube into higher and lower temperature components through energy separation to render most of the portion thereof into superheated vapors of coolant at a higher temperature and the remaining portions into vapors of coolant at a lower temperature respectively, and the superheated vapors of coolant separated to the higher temperature side are introduced into the circuit on the higher temperature side of the condenser and condensated therein, while the vapors of coolant separated to the lower temperature side are recycled to the system, of the cycle, preferably, to the circuit on the lower temperature side of the condenser. Heat may be supplied from the atmospheric air or from the compressor to the vapors of coolant from the lower temperature side of the vortex tube or, in the case where the temperature of the coolant on the lower temperature side is high, excess heat may be recovered therefrom by a heat exchanger for heat absorption.

9 Claims, 9 Drawing Figures

METHOD OF INTENSIFYING HEAT IN REVERSED RANKINE CYCLE AND REVERSED RANKINE CYCLE APPARATUS FOR CONDUCTING THE SAME

TECHNICAL FIELD

This invention concerns a method of intensifying heat in a reversed Rankine cycle, in which a vortex tube is incorporated in a coolant circuit between a compressor and a condenser in the reversed Rankine cycle, as well as a reversed Rankine cycle apparatus for conducting the same.

BACKGROUND ART

In the reversed Rankine cycle such as a heat pump, the heat calorie discharged from a condenser is generally determined by the heat calorie intaken to an evaporator and the amount of work of an compressor. Accordingly, conventional reversed Rankine cycle apparatus involves a problem in that if the heat calorie intaken to the evaporator is constant, a great amount of work has to be done by the compressor in order to increase the enthalpy in the higher temperature region and, in addition, no great coefficient of performance can be attained since the cycle takes a vertically extended configuration in the p.i diagram where the coolant is deeply brought into a super-cooling region. Furthermore, if the heat-endurance of the compressor is restricted, there is an inevitable limit for increasing the amount of work in order to increase the enthalpy.

While on the other hand, there has been known a vortex tube as a device of converting a gas supplied under a high pressure into a vortex stream at a high velocity, separating the same into higher and lower temperature components through energy separation and discharging them from two opposing exits. However, the vortex tube has hitherto been used for utilizing the separated gas on the lower temperature side while discharging the higher temperature component to the atmosphere, and there have been known no method and apparatus for intensifying heat by combining them to the reversed Rankine cycle as far as the present inventors know.

A primary object of this invention is to improve the performance of heat pumps or refrigerators or coolers by separating the superheated vapors of coolant rendered to high pressure and high temperature by the compressor in the reversed Rankine cycle into higher and lower temperature components through energy separation in the vortex tube thereby further raising the temperature of most part of the superheated vapors of the coolant.

Another object of this invention is to further increase the enthalpy, as well as protect the compressor in the reversed Rankine cycle by causing the heat generated from the compressor to be absorbed into the vapors of coolant separated by the vortex tube to the lower temperature side.

DISCLOSURE OF INVENTION

The present inventors have taken notice of the fact that most part of a gas supplied under a high pressure to a vortex tube can be taken out at a temperature much higher than that at the supply inlet by discharging only the slight portion of the gas at a high pressure from the exit on the lower temperature side, while discharging the remaining portion from the exit on the higher temperature side, and have accomplished this invention based on the findings that the performance of a heat pump or refrigerator (cooler) can be improved by combining the vortex tube with the reversed Rankine cycle.

The feature of this invention resides in introducing superheated vapors of coolant at a high pressure into a vortex tube while connecting a coolant circuit on the discharging side of a compressor in the reversed Rankine cycle to the supply inlet for pressurized gas of the vortex tube, discharging from 70% to 100% and, preferably, from 95% to 98% of the introduced superheated vapors of coolant from the exit on the higher temperature side of the vortex tubes while discharging the remaining portion from the exit on the lower temperature side thereof, thereby separating to take out from at least 70% to less than 100% and, preferably, from 95% to 98% of the superheated vapors of coolant at a higher temperature and taking out the remaining portion at a lower temperature, condensating the superheated vapors of coolant separated on the higher temperature side by the condenser in the reversed Rankine cycle while recycling the vapors of coolant separated on the lower temperature side to the system of the reversed Rankine cycle, particularly, to the coolant circuit on the lower temperature side of the condenser.

The coolant discharged from the exit on the lower temperature side of vortex tube may further be circulated under the supply of heat from the external atmosphere or the compressor, or it may be recycled to the system of the cycle after recoverying a portion of heat in a case where the temperature of the coolant is higher than required.

BEST MODE FOR CARRYING OUT THE INVENTION

This invention will now be described by way of embodiments referring to the accompanying drawings.

Figure 1:
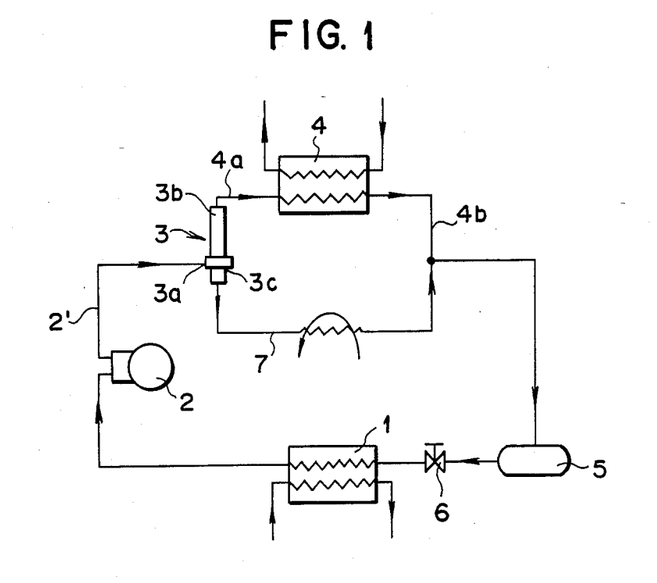
FIG. 1 is a flow chart showing the basic constitution of this invention.

FIG. 1 is a flow chart showing the basic constitution of the reversed Rankine cycle according to this invention. In a reversed Rankine cycle in which coolant, for example, Freon 22 as an operational fluid is recycled through the path: evaporator 1→compressor 2→condenser 4→liquid receiver 5→restriction valve 6→evaporator 1, a vortex tube 3 for the energy separation of superheated vapors of coolant discharged from the compressor 2 into higher and lower temperature components is incorporated between the compressor 2 and the condenser 4. Specifically, as shown in the figure, a coolant circuit 2' on the discharging side of the compressor 2 is connected to the supply inlet 3a for high pressure gas of the vortex tube 3, and the coolant circuit 4a on the higher temperature side of the condenser 4 is connected to the exit 3b on the higher temperature side of the vortex tube 3, while the exit 3c on the lower temperature side of the vortex tube 3 is connected to the system of the reversed Rankine cycle, particularly, to the coolant circuit 4b on the lower temperature side of the condenser 4 by way of a circuit 7.

The vortex tube 3 is adjusted for the flow rate such that from about 95% to 98% of the superheated vapors of coolant sent from the supply port 3a is discharged from the coolant exit 3b on the higher temperature side, while the remaining portion is discharged from the coolant exit 3c on the lower temperature side.

Figure 2:
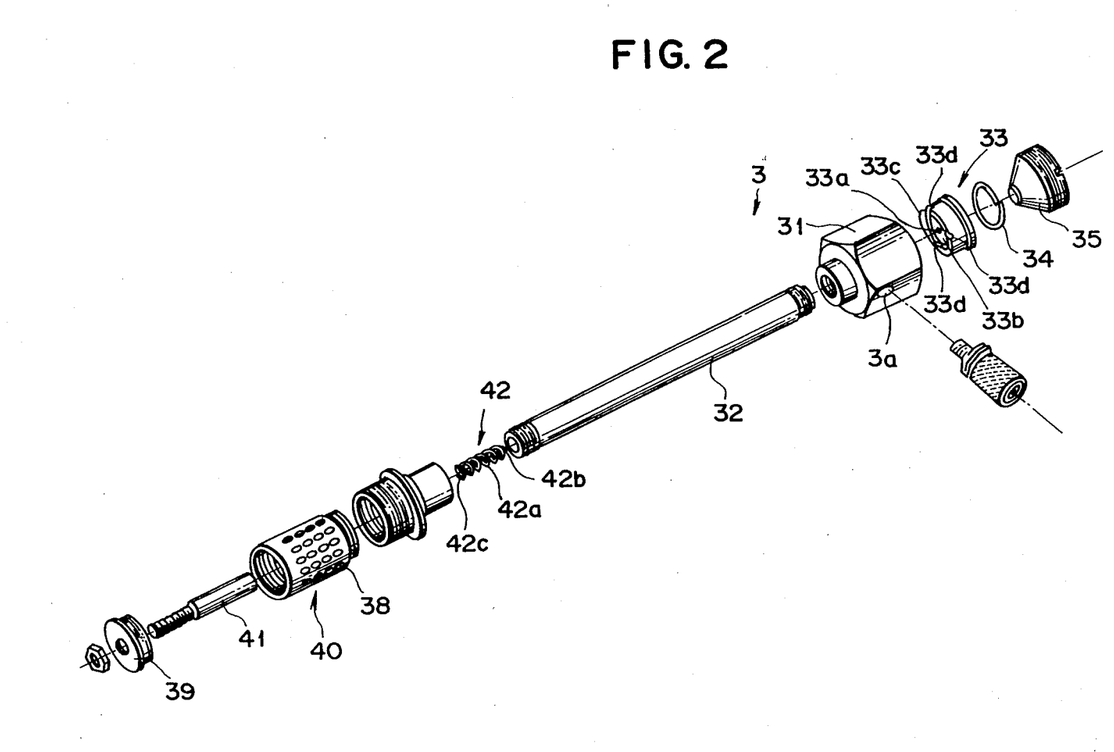
FIG. 2 is an exploded view for a preferred vortex tube.
Figure 3:
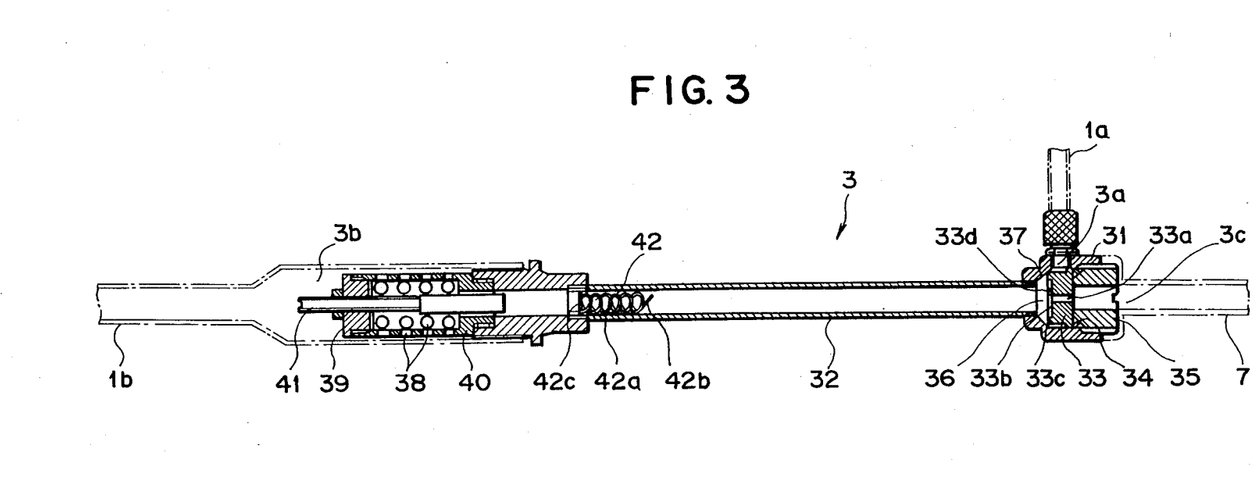
FIG. 3 is a longitudinal cross sectional view taken in an axial direction of the vortex tube shown in FIG. 2.

FIG. 2 and FIG. 3 exemplify a preferred vortex tube for use in this invention. The vortex tube 3 comprises a hollow casing 31 having a hollow cylindrical portion therein extended in the axial direction and having a supply inlet 3a for pressurized gas in communication with the inside of the hollow cylinder, a high temperature gas flow tube 32 of a diameter smaller than the inner diameter of the cylinder of the casing 3 connected to one axial opening end of the casing and a circular vortex generation device 33 having a through hole 33 perforated in the axial center and fitted in the cylindrical hollow portion of the casing 31.

The vortex generation device 33 has a recess 33b at the center of its end opposing to the high temperature gas flow tube 32, in which a plurality of grooves 33d extending slantwise or curvelinearly to the radial direction are engraved in a protruding circular edge 33c formed around the periphery of the recess 33b, and the device is disposed within the casing 31 such that the grooves 33d are opposed to the gas flow tube 32 and the upper ends of the grooves 33d are in communication with the gas supply port 3a of the casing 31.

A hollow sealing cap 35 is threadingly coupled from behind the vortex generation device 33 by way of an o-ring 34 and the top end thereof is abutted against the rear portion of the vortex generation device 33 to secure the device 33.

In this way, a pressurized gas supplied at a high velocity from the gas inlet to the inside of the casing 31 is converted into a vortex stream under the rotation at a high velocity by the vortex generation device 33 to cause temperature change therein, by which a gas at a higher temperature is discharged from the exit 3b of the high temperature gas flow tube 32, while a gas at a lower temperature is discharged through the axial center hole 33a of the vortex generation device 33 in the direction opposite to that of the higher temperature flow tube. The vortex tube 3 shown in the drawing particularly has the following features.

Specifically, as shown in FIG. 3, a gap 36 is disposed between the top end of the vortex generation device 33 disposed within the casing 31 and the inner end of the hollow casing 31 in continuous with the high temperature gas flow tube 32, and the inner circumferential surface 37 of the casing opposing to the gap 36 is tapered toward the communication port of the high temperature gas flow tube 32.

The tapered surface on the inner circumferential surface 37 of the casing is preferably formed with such an uniform angle that the apex of the taper cone defines the degree of 90°.

The top end of the high temperature gas flow tube 32 may be coupled with a heat dissipation member 40 having a plurality of discharge apertures 38 formed at the circumferential wall thereof and threadingly engaged with a cap 39 at the end thereof, or a discharge control screw 41 for higher and lower temperature gases may be attached retractably from the central aperture of the cap 39 to the inside of the heat dissipation member 40.

In the figure, reference 42 denotes a braking member comprising a spiral member 42a whose both ends 42b and 42c are bent in the diametrical direction of the spiral member 42a.

While the vortex tube as shown in FIG. 2 and FIG. 3 has much more excellent performance due to the above-described feature as compared with the conventional ones, the vortex tube for use in this invention is no way limited to the illustrated embodiment but it is of course possible to use any of known tubes.

In any case, the compressor 1 and the vortex tube 3 are constituted such that the performance of the compressor 1 may not be impaired and a vortex stream at a flow velocity required for the separation into higher and lower temperature components is generated in the vortex tube 3.

In the vortex tube 3, temperature rise in the coolant on the higher temperature side is increased where the flow rate ratio is relatively greater at the exit 3b on the side of the higher temperature and the temperature fall on the lower temperature side is increased correspondingly, that is, the temperature difference relative to the lower temperature side is enlarged as the flow rate ratio on the side of the higher temperature is made greater. Accordingly, in order to improve the coefficient of performance of the reversed Rankine cycle according to this invention when used as a heat pump or a refrigerator, it is advantageous to set the flow rate ratio in the exit 3b on the higher temperature side and that in the exit 3c on the lower temperature side such that the temperature difference between the coolant on the higher temperature side and the coolant on the lower temperature side of the vortex tube 3 is as large as possible. As the result of the experiment, it has been found in this invention that it is advantageous for improving the coefficient of performance to adjust the flow rate ratio on the higher temperature side to between about 95% and 98% and, accordingly, to adjust the flow rate ratio on the lower temperature side to between about 5% and 2% of the vortex tube 3 incorporated in the reversed Rankine cycle.

Figure 4:
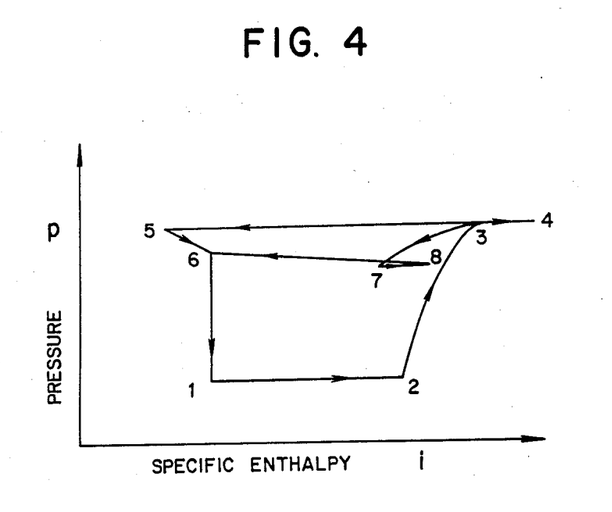
FIG. 4 is a p.i. diagram of the reversed Rankine cycle according to this invention, and FIG. 5 through FIG. 9 respectively show flow charts for other embodiments according to this invention respectively.

FIG. 4 shows the p.i. diagram in a case where the reversed Rankine cycle apparatus shown in FIG. 1 is used as a heat pump cycle and, particularly, this relates to the case where the temperature of the coolant separated on the lower temperature side of the vortex tube is lower than the external temperature. The figure is shown as an ideal cycle not considering the frictional loss.

The operation of the reversed Rankine cycle according to this invention will now be described based on FIG. 1 and FIG. 4.

Coolant subjected to isentropic expansion through the restriction valve 6 or the like (FIG. 4, 6-1) evaporates isothermally while taking external heat in the evaporator 1 to increase the enthalpy and is then sucked into the compressor (FIG. 4, 1-2).

The coolant is compressed adiabatically in the compressor 2 into superheated vapors at high pressure and high temperature and then introduced to the supply port 3a of the vortex tube 3 (FIG. 4, 2-3).

The coolant supplied under a high pressure to the vortex tube 3 is separated depending on a predetermined flow rate ratio (for instance, 97% on the higher temperature side and 3% on the lower temperature side) due to the characteristics of the vortex tube 3, and the coolant separated to the exit 3b on the higher temperature side is increased with the enthalpy and the stagnation point pressure (FIG. 4, 3-4).

The coolant on the higher temperature side whose temperature rises in the vortex tube 3 is subjected to the isobaric condensation in the condenser 4 to release the heat calorie possessed therein (FIG. 4, 4-5).

While on the other hand, the coolant separated to the exit 3c on the lower temperature side of the vortex tube 3 is decreased with the enthalpy and the pressure (FIG. 4, 3-7).

The coolant on the higher temperature side after the condensation is reduced with the pressure by the admixture with the coolant on the lower temperature side to increase the enthalpy (FIG. 4, 5-6). At the same time, the coolant on the lower temperature side is reduced with the enthalpy in admixture with the coolant on the higher temperature side to recover the pressure. Particularly, in a case where the temperature of the coolant on the lower temperature side of the vortex tube 3, that is, the temperature of the coolant in the circuit 7 is lower than the atmospheric temperature in the constitution of FIG. 1, since the coolant on the lower temperature side absorbs external heat in the circuit 7 to increase the enthalpy (FIG. 4, 7-8) and is then mixed with the coolant on the higher temperature side, the entire coolant at the inlet of a throttling valve 6 is subjected to throttling expansion while having a further increased enthalpy than that at the time of completing the condensation for the coolant on the high temperature side (FIG. 4, 6-1).

Accordingly, the entire mixed coolant is subjected to the throttling expansion at a point where the enthalpy is increased than that upon completion of the condensation for the coolant on the high temperature side.

FIG. 5 through FIG. 9 show other embodiments according to this invention. Specifically, in the embodiment shown in FIG. 5, a heat exchanger 9 is disposed in the coolant circuit 7 on the lower temperature side of the vortex tube 3 for supplying heat to the coolant on the lower temperature side and, since the enthalpy of the coolant after the mixing can be further increased, it is advantageous in the case of utilizing as a heat pump cycle.

Figure 5:
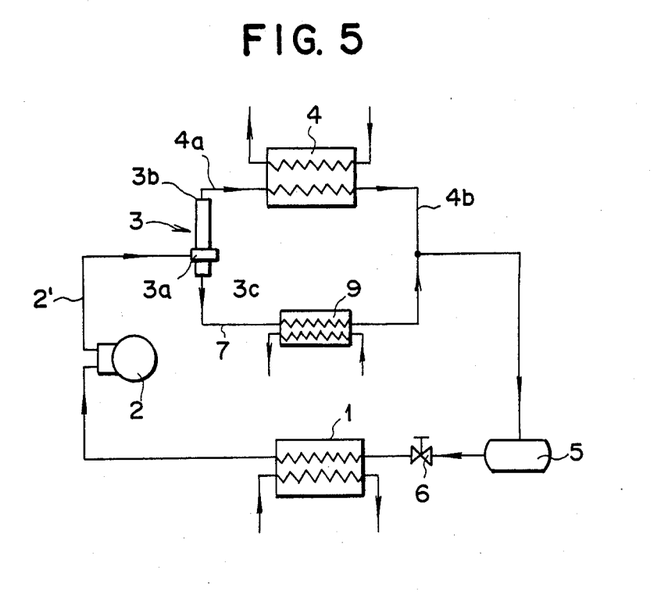
Figure 6:
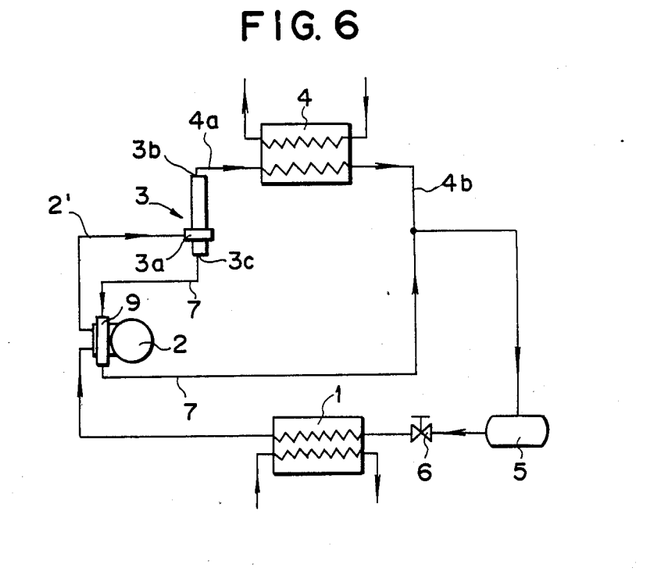

FIG. 6 shows an embodiment in which the heat exchanger 9 in the embodiment of FIG. 5 is disposed around the outer circumference of the compressor 2 to utilize the surface temperature of the compressor 2 as the heat source for the heat exchanger 9, and it has duplicate merits of requiring no particular circuit to recycle a heat source for the heat exchanger 9 and capable of cooling the compressor 2 as well.

Figure 7:
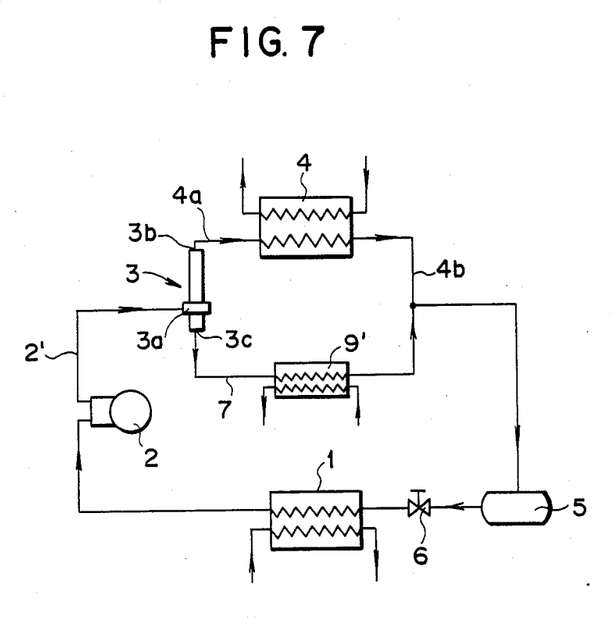

Further, in a case where the temperature of the coolant in the circuit 7 is rather high, the heat exchanger 9 for supplying the heat may be replaced with a heat exchanger 9' disposed for the heat absorption in the circuit 7 as shown in FIG. 7. In this embodiment, the heat of the coolant in the circuit 7 can directly be utilized for the warming use when applied as a heat pump cycle, as well as the temperature of the coolant after the condensation can be lowered to improve the refrigerating effect when it is operated as a refrigerating cycle.

Although, embodiments having a single vortex tube incorporated to the system of the reversed Rankine cycle have been shown in FIG. 1 and FIG. 5 through FIG. 7 for the simplicity of the explanation, this invention also includes the case of using a plurality of vortex tubes in parallel or in series in one system.

Figure 8:
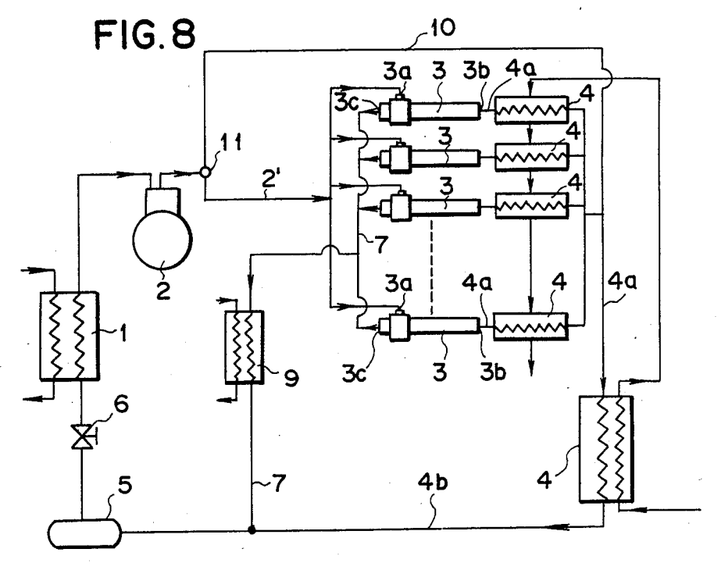

FIG. 8 shows an embodiment wherein a plurality of vortex tubes 3 are combined in parallel with each other. In this embodiment, a circuit 10 in direct connection from the compressor 2 to the condenser 4 is disposed by way of a switching valve 11, whereby it can be operated while being directly switched to a conventional apparatus in a case if the vortex tube 3 or the like should be failed.

Figure 9:
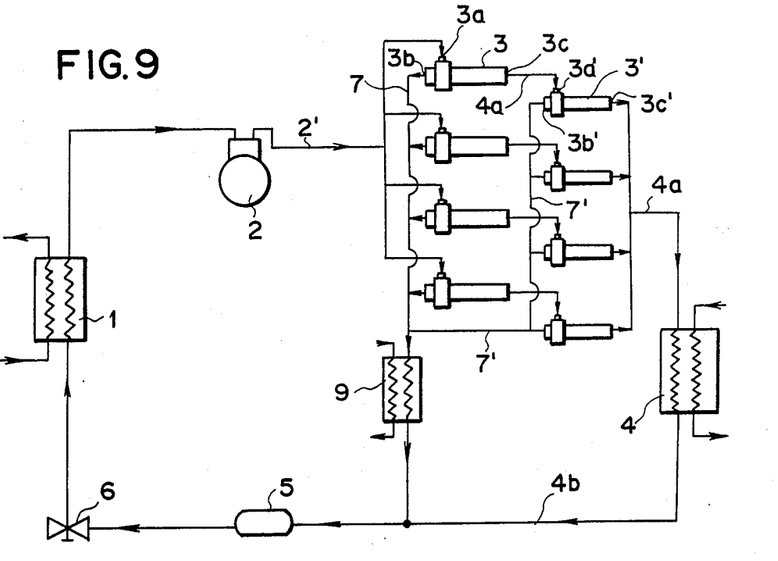

FIG. 9 shows an embodiment, wherein exits for the higher temperature coolant of primary vortex tubes 3 and the supply ports 3a' of secondary vortex tubes 3' are communicated by means of pipes into serial type composite vortex tubes, and the coolant circuit 4a on the higher temperature side of the condenser 4 is connected to the exits for higher temperature coolant of the secondary or downstream vortex tubes, and all of the exits for the lower temperature coolant of the vortex tubes are connected to the coolant circuit 4b of the lower temperature side of the condenser 4. The embodiment shown in FIG. 9 has an effect of raising the coolant temperature to a further higher temperature.

Description will now be made for the test example in which the apparatus according to this invention is used for the warming operation as a heat pump.

TEST EXAMPLE (1) Heat Pump

Kind of the coolant: Fron 22
Conditions for the coolant
 Discharging capacity of the compressor piston=46 m$^3$/hour
 Coolant recycling amount G=301 kg/hour (assuming volume efficiency=0.85)
 Compressor rated power=7.5 kW/hour
 Vortex Tube
 Twelve vortex tubes each adjusted to about 97% of flow rate ratio at the exit 3b for higher temperature coolant and to about 3% of flow rate ratio at the exit 3c for lower temperature coolant were disposed in parallel. The pipe 7 for the coolant on the lower temperature side was connected directly to the coolant circuit 4b on the lower temperature side of the condenser 4 as in the embodiment shown in FIG. 1.
 Heat source section
 Water at 16° C. was supplied at the flow rate of 15 l/min to the evaporator to conduct heat exchange
 Heat dissipating section
 Water at 16° C. was recycled at the flow rate of 30 l/min to the condenser to conduct heat exchange (2) Atmospheric temperature: 15° C.

(3) The pressure and the temperature of the coolant in each of the states within the heat pump system during operation of the apparatus were as below:

|  |  | Pressure (g) kg/cm$^2$ | Temperature (°C.) |
|---|---|---|---|
| Evaporator | evaporation temperature | 0.9 | −28 |
| Compressor | suction side | 0.9 | 5 |
|  | discharge side | 13.2 | 97 |
|  | supply port | 13.2 | 95 |
| Vortex tube | exit for high temperature gas | 13.2 | 131 |
|  | exit for low tempeature gas | 8.5 | 15 |
| Condenser | inlet | 12.7 | 131 |
|  | outlet | 12.7 | 36 |
| Expansion | inlet | 12.7 | 5 |

-continued

| | | Pressure (g) kg/cm² | Temperature (°C.) |
|---|---|---|---|
| valve | outlet | 0.9 | −28 |

Further, water at 16° C. supplied as the heat source (15 l/min) to the evaporator 1 was cooled to water at 6° C., while water at 16° C. supplied to the condenser (30 l/min) was warmed to 74° C. and then discharged.

Accordingly, the heat calorie emitted from the condenser was:

(74−16)°C.×30 l×60 min=104,400 kcal/hour, and the heat calorie taken from the heat source was:

(16−6)°C.×15 l×60 min=9,000 kcal/hour

Since the heat calorie from the amount of work is: 7.5 kW×860 kcal/hour=6450 kcal/hour, and the power of the compressor used is 7.5 kW, the coefficient of performance determined actually in the refrigerating cycle of the present test example, when assuming the heat calorie intaken from the external atmosphere of the heat pump system as 5000 kcal/hour, is represented as:

$$\frac{104400 - (9000 + 5000)}{7.5 \text{ (kW)} \times 860 \text{ (kcal/hour)}} = \frac{90400}{6450} = 14.0$$

Industrial Applicability

According to the reversed Rankine cycle apparatus of this invention, since the most portion of the superheated vapors of coolant rendered to high pressure and high temperature in the compressor is condensated after being raised to a higher temperature by the vortex tube, the heat exchanging efficiency in the condenser can be improved to take out heat at higher temperature.

Specifically, the coefficient of performance $\epsilon_h$ of the reversed Rankine cycle apparatus according to this invention when it is used as the heat pump cycle is determined based on the embodiment in FIG. 4 as:

$$\epsilon_h = \frac{m(i3 - i6)}{i3 - i2} + \frac{m((i4 - i3) + (i6 - i5))}{i3 - i2} \quad \text{(equation 1)}$$

(where m is a flow rate ratio flowing to the higher temperature side of the vortex tube, which is smaller than 1). As compared with the coefficient of performance in the conventional heat pump cycle, in the case of m≈1, it is increased by about;

$$\frac{((i4 - i3) + (i6 - i5))}{i3 - i2}$$

Accordingly, as already described above, since the operation is carried out, in the reversed Rankine cycle according to this invention, while setting the flow rate ratio for the coolant on the higher temperature side at, preferably, from about 95% to 98%, the coefficient of performance can be improved significantly.

Since a heavy work has to be done by a compressor for increasing the entropy of the coolant to the same level as that shown in FIG. 4 only by a compressor as in the usual case, it provides problems in view of the heat durability and the electric power consumption of the compressor, as well as the p.i. diagram takes a longitudinal configuration to enforce a difficulty in the throttling expansion failing to obtain desired coefficient of performance. While on the other hand, according to this invention, since the enthalpy of the coolant discharged from the compressor is increased by the vortex tube, no such problems are caused. Further, since the coolant on the lower temperature side of the vortex tube can also get the energy in the circuit 7 from the external atmosphere or from the heat source of the heat exchanger, a further contributing can be made to the improvement in the coefficient of performance. Furthermore, since the relationship between the coefficient of performance $\epsilon_h$ as the heat pump cycle and the coefficient of performance $\epsilon_c$ as the refrigerator cycle is: $\epsilon_c = \epsilon_h - 1$, the improvement in the coefficient of performance of the heat pump cycle just means the improvement in the coefficient of performance in the refrigerator cycle and, accordingly, this invention can improve the performance when it is used both to the heat pump and to the refrigerator.

In the embodiment shown in FIG. 5 and FIG. 6, since the coolant on the lower temperature side of the vortex tube absorbs heat by means of the heat exchanger and then mixed with the coolant on the higher temperature side, the enthalpy (i6−i5) in the above mentioned equation 1 is increased and, accordingly, the coefficiency of performance when it is used as the heat pump can further be improved. Particularly, in the embodiment shown in FIG. 6, since the outer circumference of the compressor is used as the heat exchanging section in the circuit 7 to absorb the heat at the outer circumference of the compressor raised to a higher temperature is absorbed, it has a merit of requiring no particular heat source outside the system and provides an advantageous effect of cooling the compressor to prevent overheating.

Furthermore, in the embodiment shown in FIG. 7, since the coolant on the lower temperature side of the vortex tube is cooled in the heat exchanger and then mixed with the coolant on the higher temperature side, the temperature of the coolant entering the evaporator is lowered and, accordingly, the performance can be improved when it is used as a refrigerator or cooler.

We claim:

1. A method of intensifying heat in a reversed Rankine cycle, which comprises:
   introducing superheated vapors of coolant at a high pressure discharged from a compressor in a reversed Rankine cycle to the supply port of a vortex tube,
   separating the superheated vapors of coolant into higher and lower temperature components through energy separation such that from 70% to 100% of the introduced superheated vapors of coolant is discharged from the exit on the higher temperature side and the remaining portion thereof discharged from the exit on the lower temperature side of said vortex tube,
   condensating the superheated vapors of coolant raised to a higher temperature separated to the exit on the higher temperature side of the vortex tube by the condenser in the reversed Rankine cycle, and
   recycling the vapors of coolant rendered to a lower temperature separated to the exit on the lower temperature side of the vortex tube to the system of the reversed Rankine cycle.

2. The method of intensifying heat as defined in claim 1, wherein from 95% to 98% of the superheated vapors of coolant at a high pressure introduced into the vortex tube is discharged from the exit on the higher temperature side and the remaining portion thereof is discharged from the exit on the lower temperature side thereby separating the superheated vapors of coolant into higher and lower temperature components through energy separation.

3. The method of intensifying heat as defined in claim 1 or 2, wherein heat is supplied to the coolant from the exit on the lower temperature side of the vortex tube and then it is recycled to the system of the reversed Rankine cycle.

4. The method of intensifying heat as defined in claim 3, wherein the heat of the compressor is supplied to the coolant separated to the exit on the lower temperature side of the vortex tube.

5. The method of intensifying heat as defined in claim 1 or 2, wherein a portion of the heat of the coolant separated to the exit on the lower temperature side of the vortex tube is absorbed.

6. A reversed Rankine cycle apparatus comprising a reversed Rankine cycle apparatus for recycling coolant as an operational fluid and
one or plurality of vortex tube 3, in which from 70% to 100% of a gas introduced at a high pressure is discharged from the exit $3b$ on the higher temperature side and the remaining portion is discharged from the exit $3c$ on the lower temperature side to thereby separate said introduced gas into higher and lower temperature components through energy separation, wherein
the coolant circuit $2'$ on the discharging side of a compressor 2 in the reversed Rankine cycle is connected to the supply port $3a$ for pressurized gas of the vortex tube 3, the coolant circuit $4a$ on the higher temperature side of a condenser 4 in the reversed Rankine cycle is connected to the exit $3b$ on the higher temperature side of the vortex tube 3, and the exit $3c$ on the lower temperature side of the vortex tube 3 is connected with the coolant circuit $4b$ on the lower temperature side of said condenser 4 by means of a circuit 7.

7. The reversed Rankine cycle apparatus as defined in claim 6, wherein the flow rate ratio at the exit $3b$ on the higher temperature side of the vortex tube is set at from 95% to 98%.

8. The reversed Rankine cycle apparatus as defined in claim 6 or 7, wherein the circuit 7 connecting the exit $3c$ on the lower temperature side of the vortex tube 3 with the coolant circuit $4b$ on the lower temperature side of the condenser 4 has a heat exchanger 9 for supplying heat to the coolant in said circuit or absorbing the heat from said coolant.

9. The reversed Rankine cycle apparatus as defined in claim 8, wherein the heat exchanger 9 of the circuit 7 is disposed at the outer circumference of the compressor 2, by which the heat from the compressor 2 is caused to be absorbed into the coolant in the circuit 7.

* * * * *